United States Patent
Ikemoto et al.

(10) Patent No.: US 7,594,084 B2
(45) Date of Patent: Sep. 22, 2009

(54) FILE STORAGE CONTROL DEVICE AND METHOD

(75) Inventors: Takumi Ikemoto, Yokohama (JP);
Nobuyuki Saika, Yokosuka (JP);
Yuuichi Ishikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 459 days.

(21) Appl. No.: 11/526,603

(22) Filed: Sep. 26, 2006

(65) Prior Publication Data

US 2008/0028164 A1    Jan. 31, 2008

(30) Foreign Application Priority Data

Jul. 27, 2006   (JP) ............................. 2006-204654

(51) Int. Cl.
*G06F 12/00* (2006.01)
(52) U.S. Cl. ................. 711/156; 711/112; 711/114; 711/165; 711/170; 711/173
(58) Field of Classification Search ............ None
See application file for complete search history.

(56) References Cited

U.S. PATENT DOCUMENTS 5,018,060 A *  5/1991  Gelb et al. ................. 707/205
6,339,810 B1 *  1/2002  Basham et al. .............. 711/111

FOREIGN PATENT DOCUMENTS

JP         2006-127143         5/2006

* cited by examiner

*Primary Examiner*—Reginald G Bragdon
*Assistant Examiner*—Shawn X Gu
(74) *Attorney, Agent, or Firm*—Antonelli, Terry, Stout & Kraus, LLP.

(57) ABSTRACT

A file storage control device (for example NAS) comprises a storage space provision portion, which provides, to a higher-level device used by a user, a single storage space associated with a plurality of logical storage units (LUs) provided by a storage system; a reception portion, which receives requests to write files to the provided storage space from the higher-level device; and a storage control portion, which selects a LU from among the plurality of LUs associated with the storage space specified by the write request, and stores all the data constituting the file according to the write request in the selected LU.

4 Claims, 14 Drawing Sheets

FIG. 9A

| LOGICAL ADDRESS | 0 | 1 | 2 | 3 | 4 | ... | 101 | 102 | 103 | ... |
|---|---|---|---|---|---|---|---|---|---|---|
| PHYSICAL ADDRESS | PV1 0 | PV1 1 | PV1 2 | PV1 3 | PV1 4 | ... | PV2 0 | PV2 1 | PV2 2 | ... |

| PV1 | AOU-LU |
|---|---|
| PV2 | HIGH-PERFORMANCE LU |
| PV3 | LOW-PERFORMANCE LU |
| PV4 | F-WORM-LU |
| PV5 | V-WORM-LU |

|  | UPDATE DATE AND TIME | AVERAGE UPDATE INTERVAL |
|---|---|---|
| NEW FILE CREATION: | 2006/5/25 19:00:00 | |
| 2ND UPDATE: | 2006/5/25 19:30:00 | 00:30:00 |
| 3RD UPDATE: | 2006/5/25 20:30:00 | 00:45:00 ····· (30+60)/2=45 |
| 4TH UPDATE: | 2006/5/25 22:30:00 | 00:70:00 ····· (45*2+120)/3=70 |

FIG. 12

|  | UPDATE DATE AND TIME | SIZE | AVERAGE INCREASE SIZE |
|---|---|---|---|
| NEW FILE CREATION: | 2006/5/25 19:00:00 | 100MB | — |
| 2ND UPDATE: | 2006/5/25 19:30:00 | 110MB | 10MB |
| 3RD UPDATE: | 2006/5/25 20:30:00 | 130MB | 15MB ····· (10+20)/2=15 |
| 4TH UPDATE: | 2006/5/25 22:30:00 | 160MB | 20MB ····· (15*2+30)/3=20 |

FIG. 13

```
AOU-LU:
    AVERAGE INCREASE SIZE > XXX MB

INTERNAL LU:
    AVERAGE READ INTERVAL > YYY MIN
    AVERAGE UPDATE INTERVAL > XYZ MIN
    AVERAGE FILE INCREASE SIZE > ZZZ MB
EXTERNALLY
CONNECTED LU:
    AVERAGE READ INTERVAL < AAA MIN
    AVERAGE UPDATE INTERVAL < BBB MIN
    AVERAGE INCREASE SIZE < CCC MB
```
~511

FILE STORAGE CONTROL DEVICE AND METHOD

CROSS-REFERENCE TO PRIOR APPLICATION

This application relates to and claims priority from Japanese Patent Application No. 2006-204654, filed on Jul. 27, 2006, the entire disclosure of which is incorporated herein by reference.

BACKGROUND OF THE INVENTION

1. Field of the Invention

This invention relates to technology for storage of electronic files.

2. Description of the Related Art

NAS (Network Attached Storage) provides file-sharing functions to client computers (hereafter "clients"). Communication protocols used by clients for NAS access include NFS (Network File System) and CIFS (Common Internet File System).

A file transmitted from a client is stored in a NAS file system. A file system is generally constructed in a logical volume; as such a logical volume, a logical volume created using an LVM (Logical Volume Manager) is used.

An LVM is a computer program having functions to combine a plurality of LUs (Logical Units) to create a single VG (Volume Group), and to allocate from the VG a plurality of LVs (Logical Volumes). Normally, a continuous region of size estimated in advance has been allocated as a partition and a file system has been constructed, in order to modify the storage capacity, a separate second file system is created, and data is copied from the first file system to the second file system. However, by using a LVM a single file system can be created combining a plurality of LUs, without any need to consider a continuous region, by adding LUs the file system can be expanded, and in other ways also volume management becomes more flexible.

FIG. 1 shows an example of the relation between a file system and logical volumes.

Volumes which are shaded represent elements visible from a GUI screen (for example, a screen provided to the client), and volumes with no shading represent volumes not visible in a GUI screen, but visible to CLI (for example, in a screen provided to the management terminal). In FIG. 1, the layer below the double lines represents volumes managed by the storage system 809 connected to NAS, and the layer above the double lines represents volumes managed by NAS 801.

In the storage system 809 are for example a plurality of PDEVs (physical devices) and a plurality of LUs (logical units). One PDEV is constructed from storage areas provided by one or more storage devices provided in the storage system 809. One LU is constructed from one PDEV, or from a plurality of PDEVs combined into one (for convenience called a "LUSE" or Logical Unit Size Extension").

The NAS 801 comprises a file sharing program 803, file system (FS) program 805, and LVM 807. The LVM 807 manages, for example, SCSI devices, PVs (physical volumes), VGs (volume groups), and LVs (logical volumes). One SCSI device is one LU recognized by the NAS. The PV is created by securing a region for LVM use (VGDA (Volume Group Descriptor Array)) at the beginning of the disk image for a specific device (for example, an LU, hard disk drive, or similar). The VGDA can hold the name of the VG to which it belongs as well as information relating to all the PVs of the VG, or information relating to all allocated LVs. A VG is constructed from a plurality of PVs. An LV is a virtual device, created by allocation from a VG, and can be used similarly to an ordinary physical device. The FS 805 is constructed on an LV.

Japanese Patent Laid-open No. 2006-127143 discloses technology which merges a plurality of physical volumes to provide a single logical volume.

SUMMARY OF THE INVENTION

In general, the primary purpose of an LVM is to display a plurality of LUs together as a single file system. Hence in a file system program, no distinction is made between LUs when storing a file in a file system. As a result, as shown in the example of FIG. 2, there may occur cases in which blocks allocated to files span a plurality of LUs. Specifically, for example, first block data 903 constituting one file 901 may be stored in a first LU 911A, while second block data 905 constituting the file 901 is stored in a second LU 911B. In this case, if data migration or data copying is performed in LU units, block data constituting a file is missing in the LU which is the migration destination or the copy destination. Specifically, when for example the second LU 911B is migrated to or copied to a third LU, not shown, only the first block data 903 of the file 901 exists in the third LU which is the migration or copy destination, and so the file 901 cannot be obtained from the third LU.

In order to prevent this, a method is conceivable in which one file system is constructed for each LU; but in this case the user must discriminate between file systems for each LU, detracting from usability for users.

Hence an object of the invention is to enable storage of a single file so as not to span a plurality of LUs, without detracting from usability for users.

Other objects of the invention will become clear from the subsequent explanation.

A file storage control device according to this invention comprises a storage space provision portion, which provides, to a higher-level device used by a user, a single storage space associated with a plurality of logical storage units (LUs) provided by a plurality of storage systems; a reception portion, which receives from the higher-level device write requests to write to the provided storage space; and a storage control portion, which selects an LU from among the plurality of LUs associated with the storage space specified by the write request, and stores in the selected LU all the data constituting the file according to the write request. The file storage control device may be a device existing in a location removed from both the higher-level device and from the storage system, or may be a device installed in the storage system.

In one aspect, a policy storage portion, which stores electronic policies defining which files with which characteristics are to be stored in which LUs with which characteristics, is further provided. The storage control portion uses the policies to identify LU characteristics matching the file characteristics of the file, and selects an LU with the identified LU characteristics.

In a second aspect, the storage system provides an automatic capacity-expansion LU to the file storage control device, and allocates unallocated storage areas among the plurality of storage areas to the automatic capacity-expansion LU, according to writing to the automatic capacity-expansion LU. The automatic capacity-expansion LU is included in the plurality of LUs. If the file is a new file not existing in the plurality of LUs, the storage control portion selects the automatic capacity-expansion LU.

In a third aspect, the storage control portion checks the file characteristics of each file stored in the plurality of LUs, identifies first LU characteristics matching the file characteristics of the file, and if the file exists in a second LU with second LU characteristics different from a first LU with the identified first LU characteristics, causes the file to be migrated from the second LU to the first LU.

In a fourth aspect, given the above third aspect, the plurality of LUs comprise high-performance LUs and low-performance LUs with low performance compared with the high-performance LUs. The file storage control device further comprises an access frequency management portion, which manages, for each file, the frequency of access to files. The storage control portion migrates files with high access frequencies to the high-performance LUs, and migrates files with low access frequencies to the low-performance LUs.

In a fifth aspect, given the above fourth aspect, a high-performance LU is an internal LU, which is an LU prepared from a storage device provided in the storage system, and a low-performance LU is an external connected LU, which is a virtual LU, mapped to a storage resource of an external storage system connected to the storage system.

In a sixth aspect, given the above third aspect, the storage system provides an automatic capacity-expansion LU to the file storage control device, and according to writing to the automatic capacity-expansion LU, unallocated storage areas among the plurality of storage areas are allocated to the automatic capacity-expansion LU. The automatic capacity-expansion LU is included in the plurality of LUs. The file storage control device comprises a file size management portion, which manages, for each file, an average increase size, which is a file size increase per unit time due to updating. The storage control portion causes files the average increase size of which is equal or greater to a prescribed value to be migrated to the automatic capacity-expansion LU.

In a seventh aspect, given the above third aspect, the storage control portion identifies a WORM (Write Once Read Many) file among the plurality of files stored in the plurality of LUs, and causes the identified WORM file to be migrated to a WORM LU among the plurality of LUs.

In an eighth aspect, given the seventh aspect, when storage time limits are set in file units, the storage control portion causes files having the storage time limit to be migrated to the WORM LU, a WORM attribute and storage time limit are set for files at the migration destination, and, when the same storage time limit is set for two or more files, an LU having a storage capacity equal to or greater than the total file sizes of the two or more files is secured from among the plurality of LUs, the two or more files are caused to be migrated to the secured LU, and the WORM attributes and the storage time limit are set for the secured LU.

In a ninth aspect, an address map storage portion is further provided, storing an address map, which represents a correspondence relation between addresses in the storage space and addresses in the plurality of LUs. The storage control portion stores all the data of files in selected LUs by referencing the address map.

In a tenth aspect, a policy storage portion, which stores electronic policies defining which files with which file characteristics are to be stored in which LUs with which LU characteristics, and an address map storage portion, which represents a correspondence relation between addresses in the storage space and addresses in the plurality of LUs. By referencing the address map, the storage control portion stores all data of the files in the selected LU, and then checks the file characteristics of each file stored in the plurality of LUs, identifies first LU characteristics matching the checked file characteristics by employing the policies, and if the file exists in a second LU with second LU characteristics different from a first LU with the identified first LU characteristics, causes the file to be migrated from the second LU to the first LU, and at this time references the address map, and executes control to store all the data constituting the file in the first LU.

The storage portions provided in the above-described file storage control devices can for example be constructed using memory or other storage resources. Other portions can be constructed as hardware, as computer programs, or as combinations thereof (for example, with a portion realized as a computer program, and the remainder realized in hardware). A computer program can be caused to be read and executed by a prescribed processor. Further, upon information processing in which a computer program is read and executed by a processor, storage areas in memory or other hardware resources may be used as appropriate. A computer program may be installed on the computer from a CD-ROM or other storage media, or may be downloaded to the computer via a communication network.

BRIEF DESCRIPTION OF THE DRAWINGS

FIG. 9A shows an example of an address map managed by the file system program 253;

FIG. 9B shows an example of a PV/LU management table managed by the file system program 253;

FIG. 11 is an explanatory diagram of average update intervals;

FIG. 12 is an explanatory diagram of average increase size;

FIG. 13 shows an example of policies 551;

DESCRIPTION OF THE PREFERRED EMBODIMENTS

Figure 3:
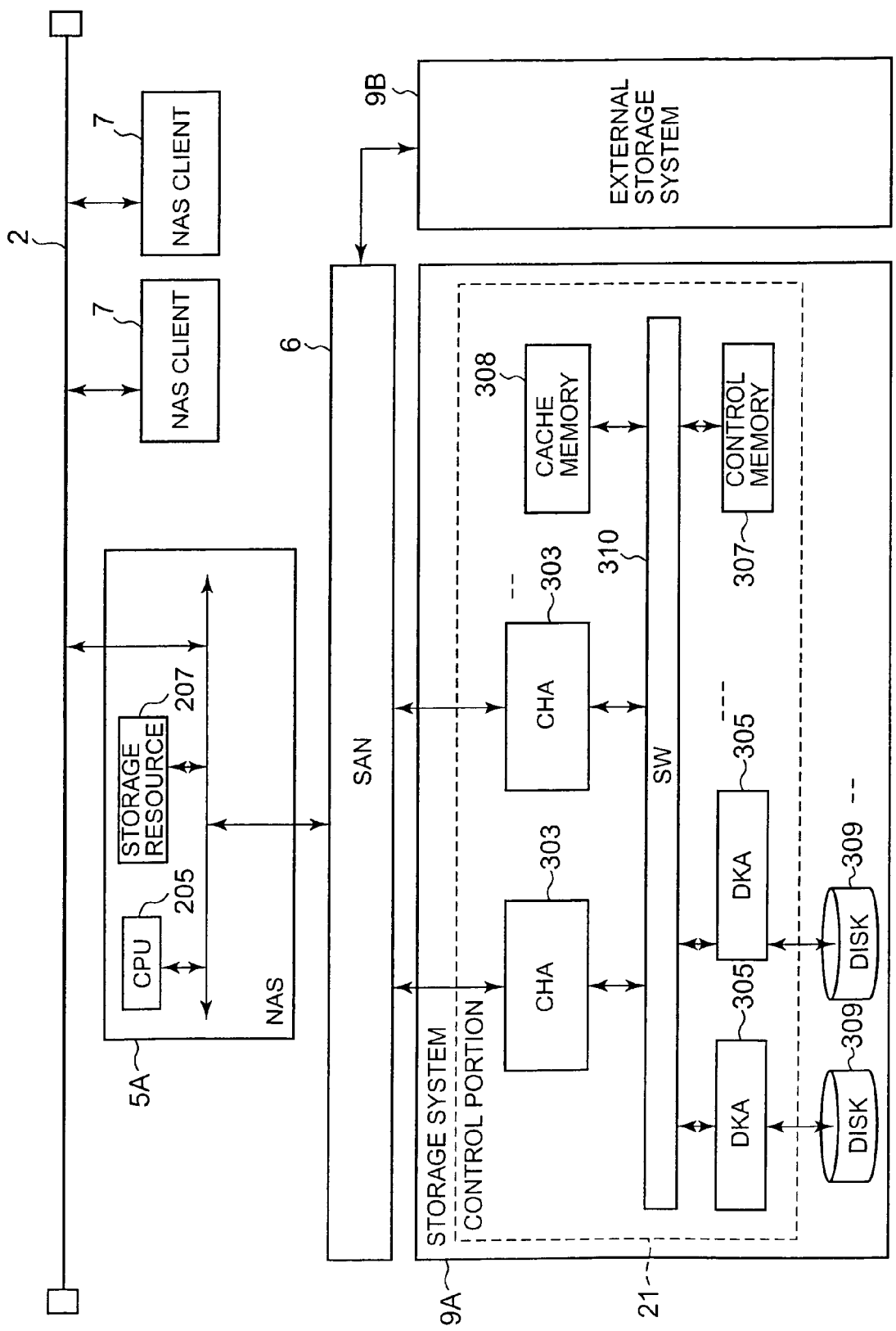
FIG. 3 shows a summary of an example of the physical configuration of the system of one aspect of the invention.

FIG. 3 shows a summary of an example of the physical configuration of the system of one aspect of the invention.

A plurality of client computers (hereafter "clients") 7, 7, . . . , and a NAS 5, are connected to a first communication network 2. The NAS 5, a storage system 9A, and an external storage system 9B are connected to a second communication network 6. Various networks can be used as each of the two communication networks 2, 6. Below, the first communication network 2 is assumed to be a LAN (Local Area Network), and the second communication network 6 is assumed to be a SAN (Storage Area Network). The NAS 5 and storage system 9A may be connected by a dedicated line in place of a communication network. The storage system 9A and external storage system 9B may also be connected by a dedicated line.

The NAS 5 is a type of computer which functions as, for example, a file server. The NAS 5 stores files specified by a client 7 in an LU of the storage system 9A, or reads files specified by a client 7 from an LU and transmits the files to the client 7. Specifically, the NAS 5 receives file-level I/O commands (write commands and read commands) from clients 7 via the LAN 2, converts these to block-level I/O commands, and transmits the block-level I/O commands to the storage system 9A via the SAN 6. The NAS 5 may be a so-called E-NAS (Embedded NAS) installed in the storage system 9A, or may be a so-called G-NAS (Generic NAS) existing at a location removed from the storage system 9A. The NAS 5 comprises for example a CPU (Central Processing Unit) 205, storage resource 207, and other hardware resources. The storage resource 207 can comprise one or more types of storage device (for example, memory, hard disks).

The storage system 9A comprises a control portion 21 and a plurality of disk-type storage devices (for example, HDDs) 309. In place of or in addition to disk-type storage devices 309, other types of storage device (for example, flash memory) may be used. The control portion 21 controls operation of the storage system 9A. The control portion 21 receives block-level write commands from the NAS 5 and writes data to disk-type storage devices 309 according to the write commands, and receives block-level read commands from the NAS 5 and reads data from disk-type storage devices 309 and transmits the data to the NAS 5 according to the read commands. The control portion 21 comprises, for example, a plurality of channel adapters (hereafter "CHAs"), a plurality of disk adapters (hereafter "DKAs") 305, cache memory 308, control memory 307, and a switch (hereafter "SW") 310.

Each of the plurality of CHAs 303 controls communication with the NAS 5. Each CHA 303 is for example a circuit board comprising a CPU and memory. The first CHA 303 can write data from the NAS 5 to cache memory 308, and can read data written by the DKA 305 from cache memory 308 and transmit the data to the NAS 5. When an I/O command received by the first CHA 303 specifies an LU mapped to an LU of the external storage system 9B (hereafter, an "external LU"), the second CHA 303 can transmit the I/O command specifying the external LU to the external storage system 9B.

The DKAs 305 control communication with the disk-type storage device 309. A DKA 305 can write data from a disk-type storage device 309 to cache memory 308, and can read data written by a CHA 303 from cache memory 308 and write the data to a disk-type storage device 309. A DKA 305 can use effectively the same hardware configuration as a CHA 303.

Cache memory 308 can store data which is exchanged between the NAS 5 and a disk-type storage device 309. The control memory 307 can store information necessary for control of the storage system 9A (for example, LU management information indicating from which disk-type storage device 309 an LU is being provided).

The SW 310 can switch connections between the CHAs 303, cache memory 308, control memory 307, and DKAs 305.

The external storage system 9B is a storage system which augments the storage system 9. As the external storage system 9B, for example, a comparatively inexpensive storage system equipped with SATA (Serial ATA) or other disk-type storage devices can be used. The external storage system 9B can be configured similarly to the storage system 9. Or, for example the configuration of at least one among the storage system 9 and external storage system 9B is not limited to the above, and for example the control portion 21 may be a circuit board comprising one or a plurality of CPUs and one or a plurality of memory units, having regions used as cache memory 308 and/or as control memory 307.

Figure 4:
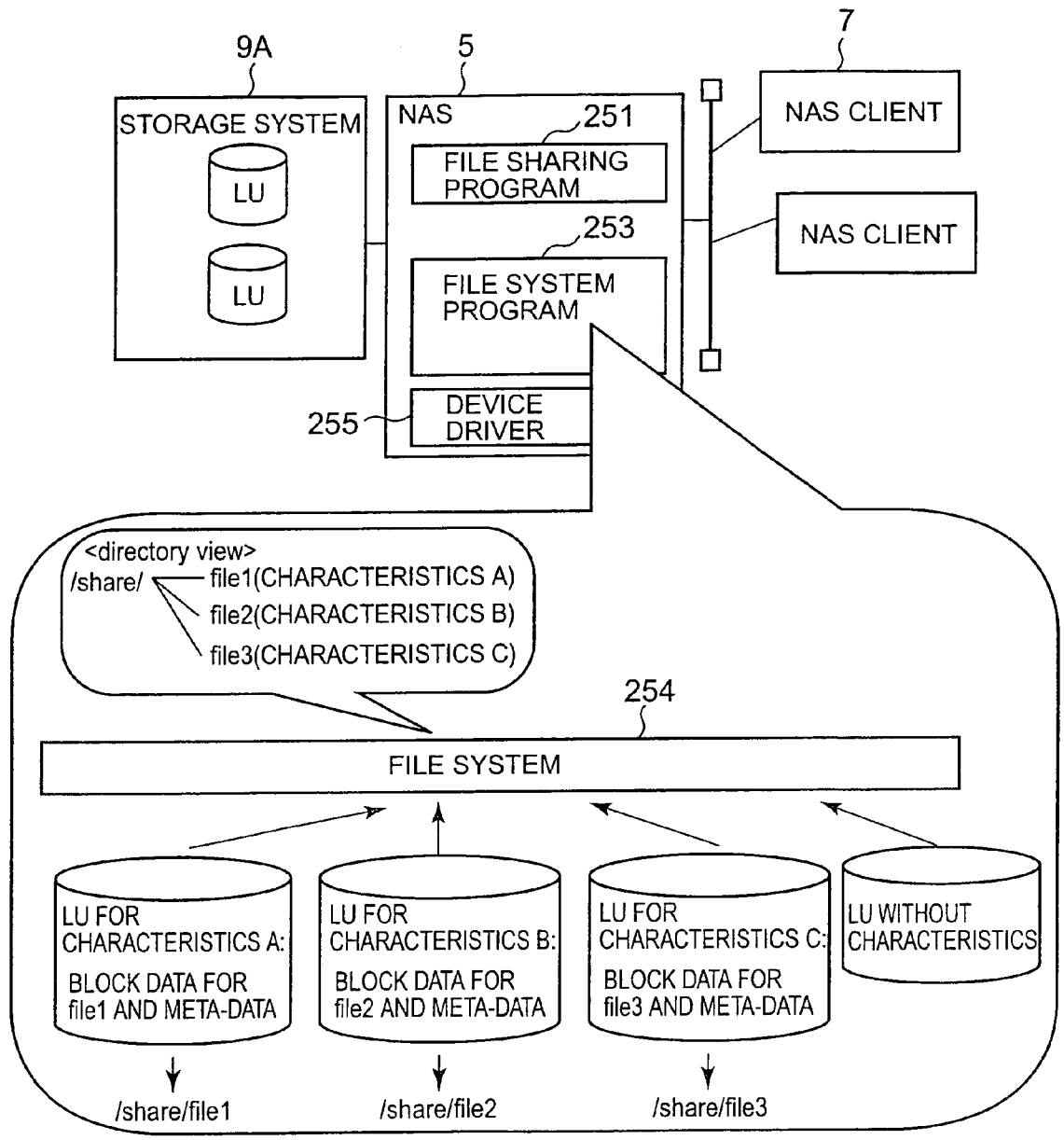
FIG. 4 is an explanatory diagram summarizing the aspect.

FIG. 4 is an explanatory diagram summarizing the aspect.

The NAS 5 comprises a file sharing program 251, a file system program 253, and a device driver 255. Below, when a computer program is the subject of a sentence, processing is in fact performed by the CPU which executes the computer program.

The file sharing program 251 is a computer program which provides a file sharing protocol (for example, NFS or CIFS) to the clients 7, and which provides functions for file sharing between clients. The file sharing program 251 receives file-level I/O commands (requests in file units) from clients 7, and executes file unit I/O (read/write) processing using the file system program 253.

Figure 5:
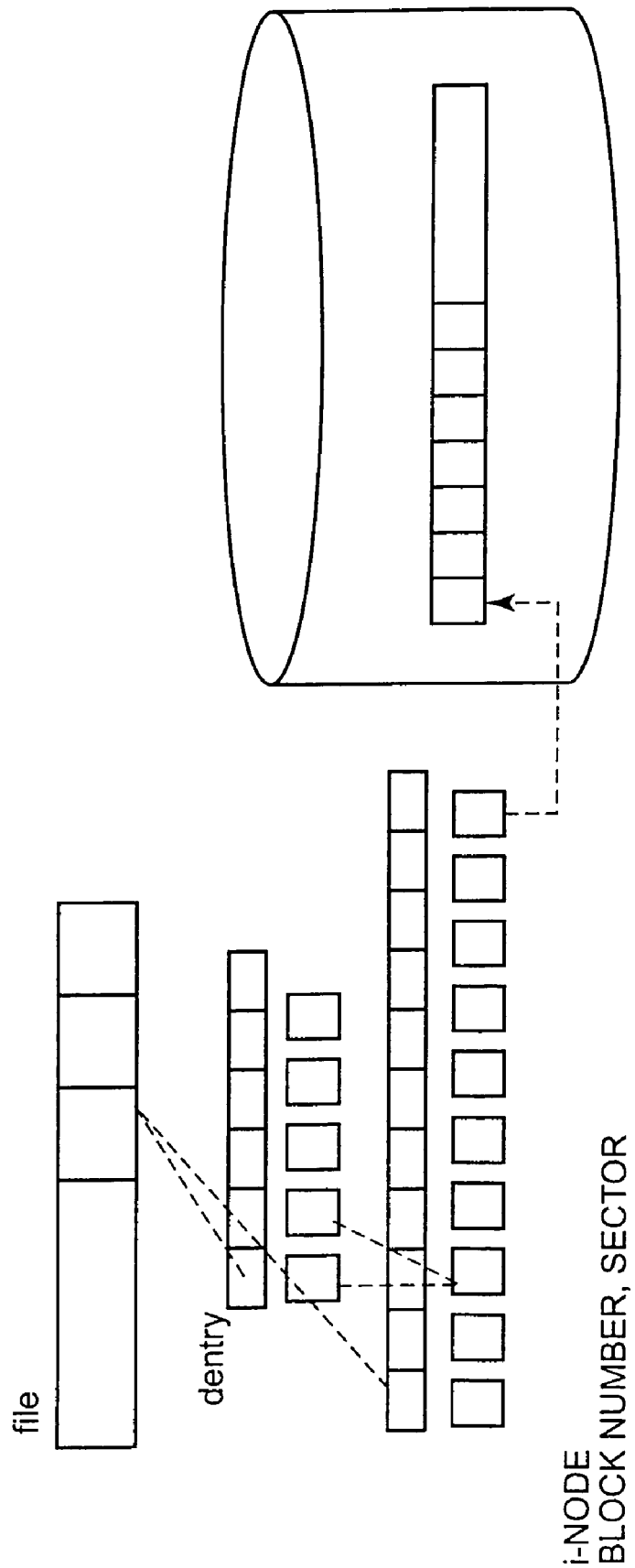
FIG. 5 shows an example of the management mode in an i-node.

The file system program 253 is a program which manages the file system 254. The file system program 253 provides a hierarchically structured logical view (directories, files, and similar) to a higher-level layer (for example, to the file sharing program 251), converts this view into physical data structures (block data, block addresses), and executes block-unit I/O processing with a lower-level layer (for example, the device driver 255). Because data "read", "write", and other operations are performed in "file" units, the file system program 253 abstracts the storage devices and performs intermediary operations for data storage. The basic unit for abstraction is, for example, the "i-node". FIG. 5 shows an example of a management mode using i-nodes. An i-node has disk information, block information, and position information indicating the actual storage device; the geometry of a storage device is uniquely identified by an i-node (in FIG. 5, "dentry" is an abbreviation of "directory entry").

The device driver 255 is a program which executes block-unit I/O requested by the file system program 253. The device driver 255 controls access to LUs (LUs within the storage system 9) recognized as SCSI devices by the NAS 5.

A major feature of this aspect is the file system program 253, with innovations. This file system program 253 combines a plurality of LUs having different LU characteristics (strictly speaking, a plurality of PVs respectively corresponding to a plurality of LUs) in a single file system 254, and presents to the user a logical view (a view to present the storage space) of the storage space (for example directories) on the file system 254. In FIG. 4, four types of characteristic, A, B, C, and none, are shown as examples of LU characteristics; the storage space is presented as a shared directory. A, B, C respectively indicate file characteristics. That is, for example, the LU with characteristics A signifies an LU to store files have file characteristics A. "None" means that the characteristics apply to none of A, B or C.

Figure 6:
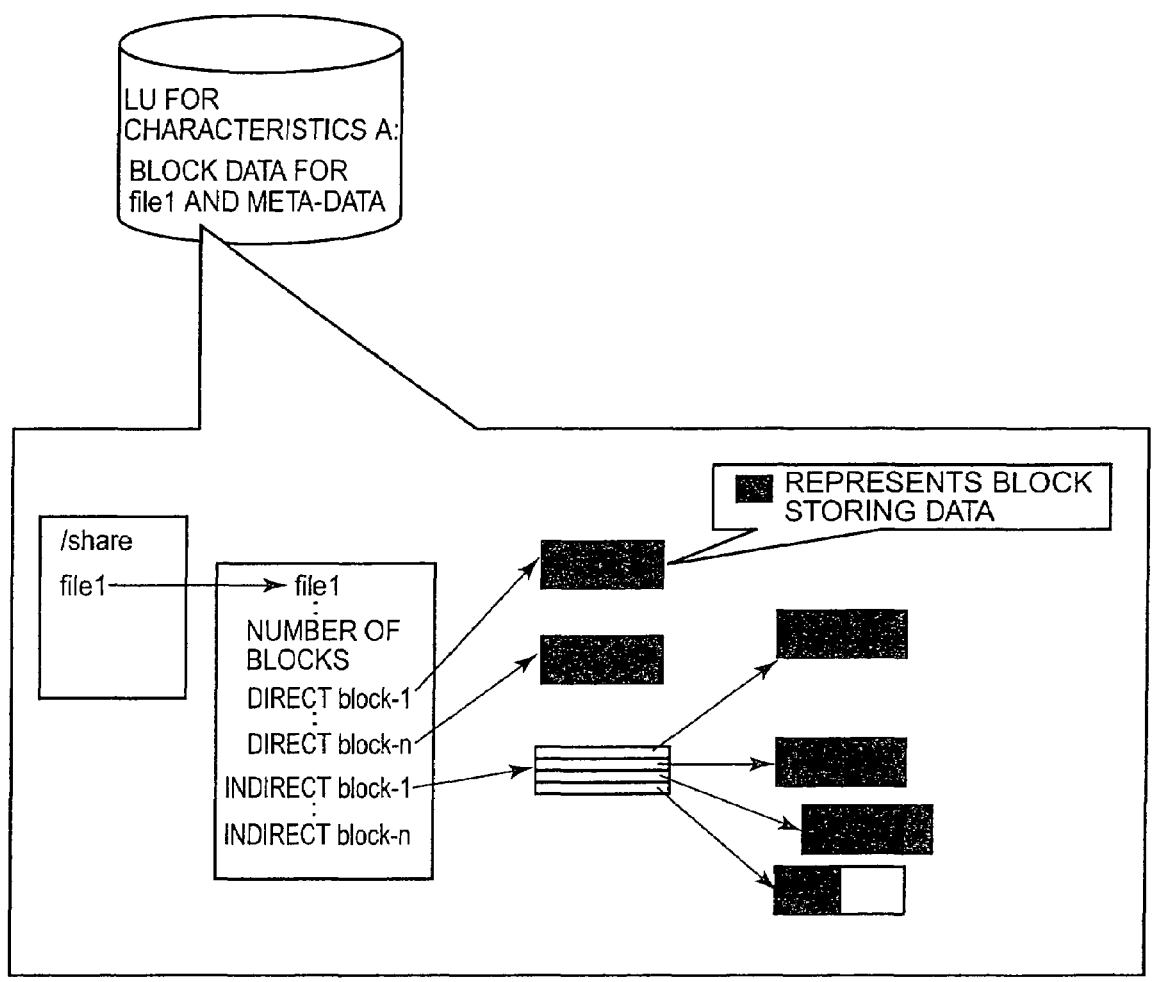
FIG. 6 shows the management mode when file1 is stored in an LU with characteristics A.

In the example of FIG. 4, when the files file1, file2, file3 are stored in the shared directory/share on the file system 254, if the characteristics of the files are A, B and C, then file1 is stored in the LU for characteristics A, file2 is stored in the LU for characteristics B, and file3 is stored in the LU for characteristics C. In each LU are stored meta-data and block data of files with matching characteristics. Meta-data is information necessary for management of files on the file system 254. FIG. 6 shows a management mode for a case in which file1 is stored in the LU for characteristics A. Storing is performed according to i-nodes, and by referencing meta-data, the number of blocks storing the data of file1, and the locations of the blocks, can be identified. Among the identified blocks are those which are directly identified from the referenced entries (direct blocks), as well as those which are identified at a distance of one or more other entries from the referenced entry (indirect blocks).

By means of this file system program 253, the characteristics of LUs belonging to the file system 254 having the storage space cannot be ascertained from the logical view of the storage space presented to the user. That is, the user need only perform operations to store the desired files in a single storage space, without being aware of the characteristics of the LUs belonging to the storage space, for example, or the characteristics of the files which are to be stored. Even when files are stored in this way, by means of a mechanism explained below, files are stored without one file spanning a plurality of LUs, and moreover the file is allocated to an LU conforming to the characteristics of the file.

Figure 7:
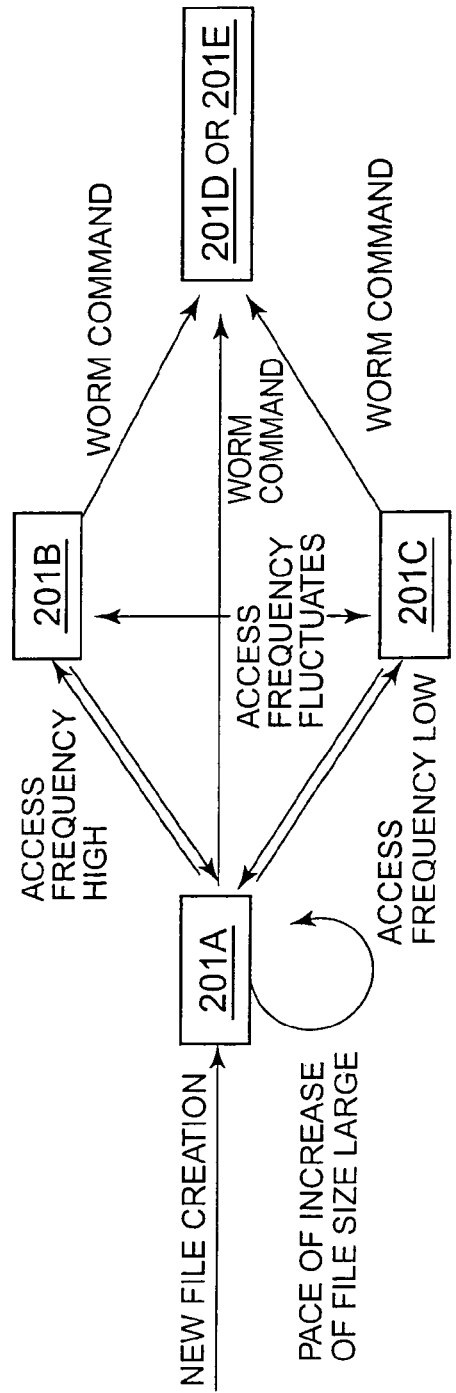
FIG. 7A is an explanatory diagram of LU characteristics associated with the file system 254.
FIG. 7B is a summary diagram of file storage control performed by the file system program 253.
Figure 8:
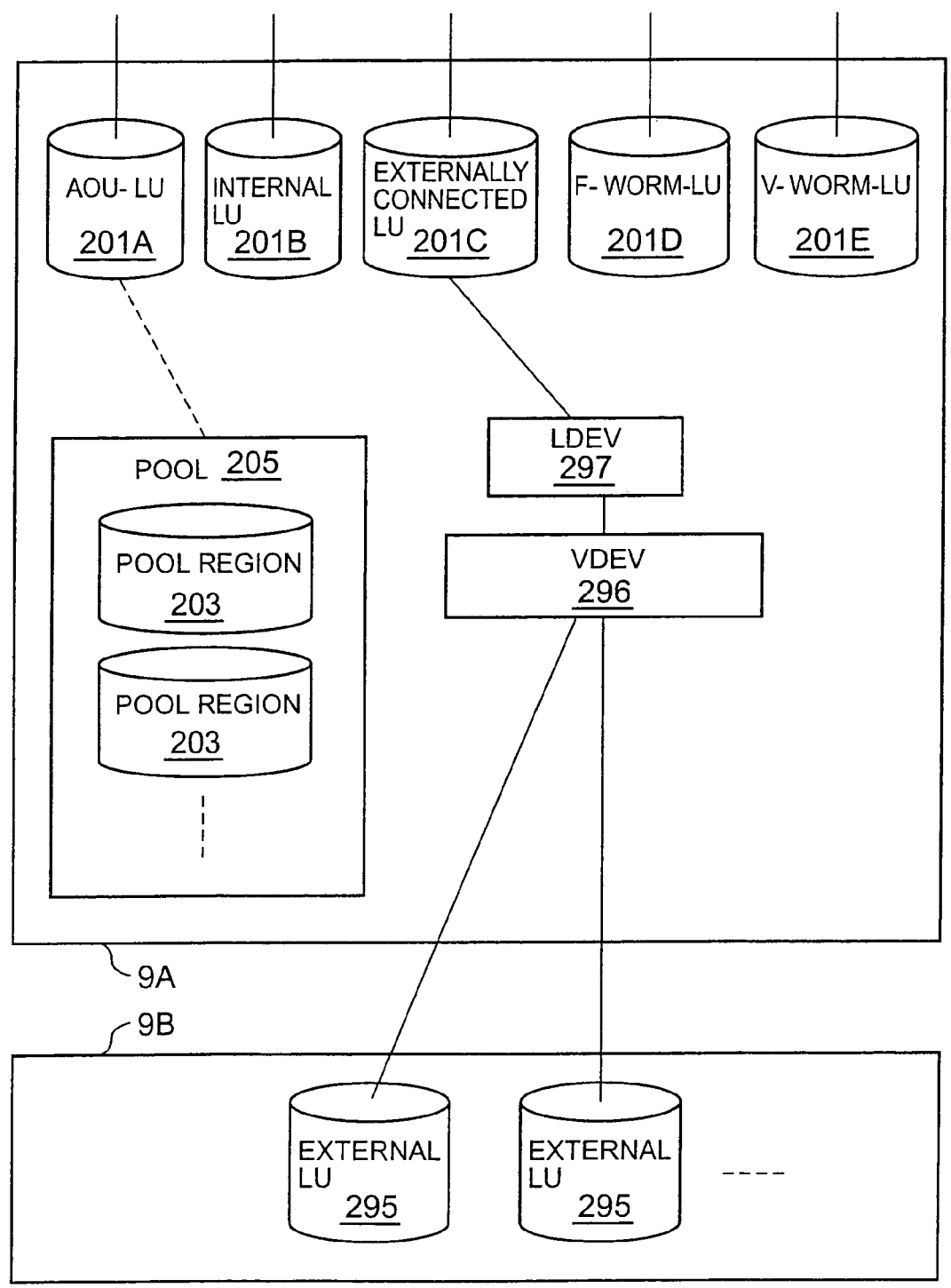
FIG. 8 is an explanatory diagram of different LU characteristics.

FIG. 7A is an explanatory diagram of LU characteristics associated with the file system 254. FIG. 8 is an explanatory diagram of different LU characteristics.

In this aspect, five LUs corresponding to at least five types of characteristics (five PVs corresponding to five LUs) are combined in the file system 254. These five LUs need not necessarily exist in a single storage system 9A. When there are a plurality of storage systems 9A, the LUs may be distributed among the plurality of storage systems 9A.

The first LU is AOU (Allocate ON Use)-LU 201A. AOU-LU 201A is a virtual LU provided by NAS 5. When necessary (for example, upon receiving a write command for the LU), a control portion 21 (for example, CHA 303) of the storage system 9A allocates an unused pool region 203 from the pool 205 in which are stored a plurality of pool regions (for example, storage areas of prescribed size) 203, and releases unnecessary pool regions 203 (which are returned to the pool 205) allocated to the AOU-LU 201A. This technology may be called automatic capacity expansion. This technology can for example claim technology disclosed in Japanese Patent Laid-open No. 2003-15915 (U.S. Pat. No. 6,725,328, U.S. Pat. No. 6,836,819, U.S. patent application Ser. No. 10/991421).

The third LU is the high-performance LU 201B. Files for which access frequency is high, and for which fast response is required, are stored in high-performance LU 201B. The high-performance LU 201B may be an LU provided from a physical storage device which is fast and/or highly reliable; but in this aspect, an internal LU is used as the high-performance LU. An internal LU is an LU provided by the disk-type storage device 309 of the storage system 9A, and is an LU which is not mapped to an external LU.

The second LU is the low-performance LU 201C. Files with low frequency of file access and for which high response is not required are stored in the low-performance LU 201C. The low-performance LU 201C may be an LU provided by a physical storage device with low speed and/or low reliability; but in this aspect, the low-performance LU is an externally connected LU. An externally connected LU 201C is a virtual LU provided by mapping an external LU 295, via the VDEV 296. The external LU 295 is an external LU existing in the external storage system 9B. The VDEV (virtual device; specifically, virtual storage space) 296 is formed in the storage system 9A through one or more external LUs 295, and the externally connected LU 201C is provided by a logical storage device (LDEV), detached from the VDEV 296. When I/O of the low-performance LU 201C occurs, I/O of the external LU 295 to which it is mapped occurs. As technology related to such an external connection, the technology disclosed for example in Japanese Patent Laid-open No. 2005-107645 (U.S. patent application Ser. No. 10/769805, U.S. patent application Ser. No. 11/471556) can be employed.

The fourth LU is the F-WORM-LU 201D. Here "F" indicates file units. "WORM" is an abbreviation of "Write Once Read Many", and means that a file, once created, is not updated. Files having WORM characteristics include, for example, files of official documents (such as contracts), files of documents for which the period of storage is stipulated by law, and similar. Files which are to have WORM characteristics are stored, in file units, in the F-WORM-LU 201D.

The fifth LU is the V-WORM-LU 201E. "V" indicates volume units, that is, LU units. "WORM" has the meaning explained above. Files which are to have WORM characteristics in volume units are stored in the V-WORM-LU 201E.

FIG. 7B is a summary diagram of file storage control performed by the file system program 253.

When storing a newly created file (hereafter a "new file"), the file system program 253 stores the new file in the AOU-LU 201A. For example, when a new file is created, the file size may increase according to the circumstances of file updates, and so the AOU-LU 201A, which can flexibly accommodate such increases in file size (that is, increases in required storage capacity), is suitable.

After the new file is stored, the characteristics of the new file are changed from "new file" to other characteristics, according to the conditions of use of the new file. Accompanying this, the stored location of the file is changed by the file system program 253 due to migration of the file as appropriate. Specifically, when for example the file size no longer increases, the file system program 253 migrates the file to the high-performance LU 201B or to the low-performance LU 201C, according to the frequency of access. And, when for example there is a request for WORM characteristics, the file system program 253 migrates the file to the LUs 201D or 201E for WORM use. The fact of such migrations is not evident when viewing the logical view presented to the user, and so the user can access the file as usual. When file migration has been performed, the file system program 253 can change the file path to the file from the file path of the migration source to the file path of the migration target.

The file system program 253 ensures that a file is not stored spanning a plurality of LUs, and moreover that the file is stored in an LU having LU characteristics conforming to the file characteristics; in order to do so, for example, the address mapping in the example described below is performed.

FIG. 9A shows an example of an address map managed by a file system program 253. FIG. 9B shows an example of a PV/LU management table managed by the file system program 253.

Figure 1:
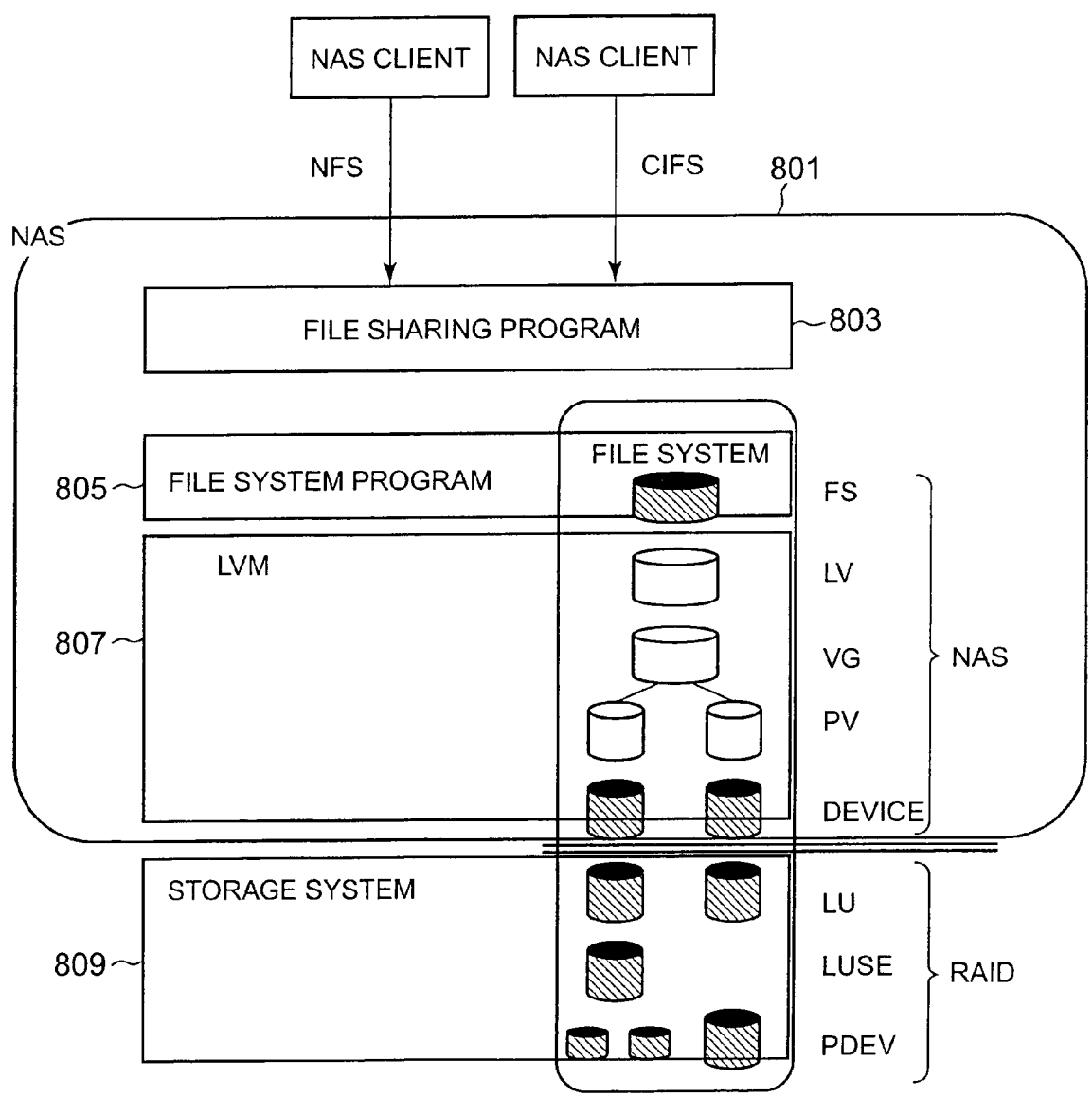
FIG. 1 shows an example of the relation between a file system and logical volumes.
Figure 2:
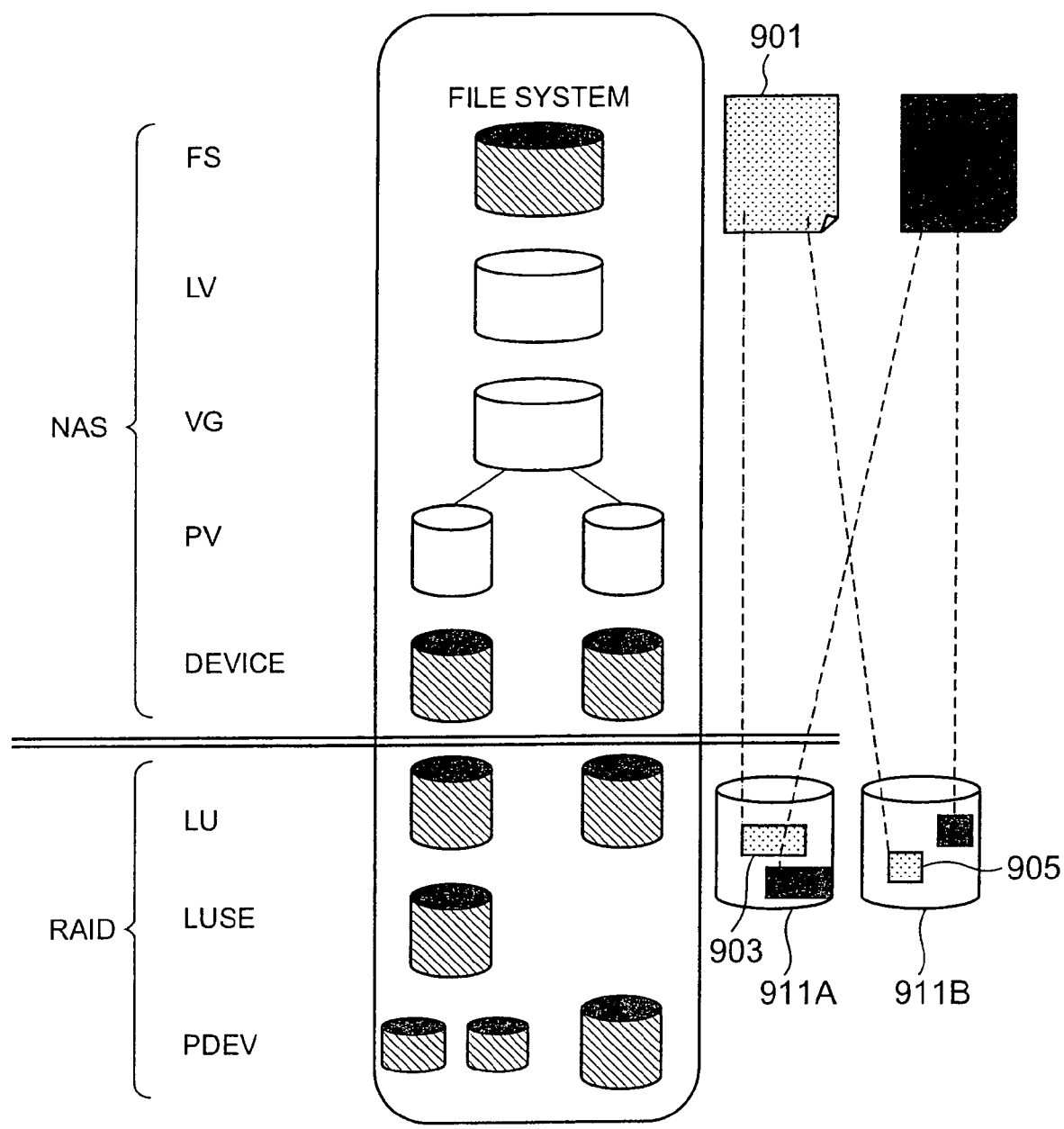
FIG. 2 is an explanatory diagram of one problem with technology of the prior art.

By means of this address map 601, physical addresses (P addresses) are mapped to logical addresses (L addresses). A logical address is for example an address number in a storage space provided to the user side. By continuously arranging address numbers, a logical view is presented to the user as a single continuous storage space. On the other hand, a physical address is an address representing the equivalent of, for example, a location in a PV (see FIG. 1) with a certain identifier.

In the PV/LU management table 603, PV identifiers are associated with the LU characteristics of the LUs to which are allocated the PVs of the PV identifiers.

Based on this address map 601 and PV/LU management table 603, the file system program 253 prevents a file from being stored spanning a plurality of LUs, and can store the file in an LU having LU characteristics conforming to the file characteristics. The method of management to determine to which LU a logical address belongs is not limited to this, and other methods can be used.

Figure 10:
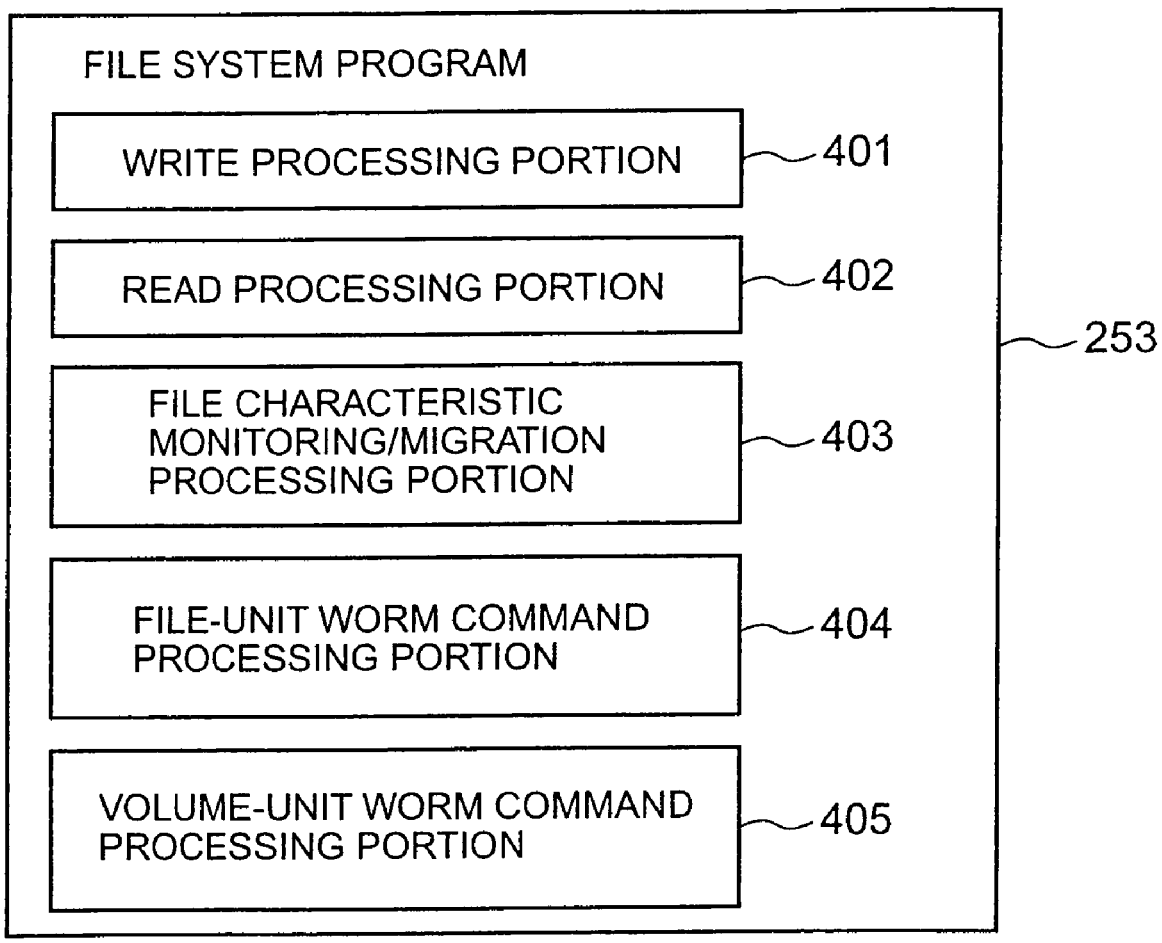
FIG. 10 is a functional block diagram of the file system program 253.

FIG. 10 is a functional block diagram of the file system program 253.

The file system program 253 comprises, as a plurality of computer programs, a write processing portion 401, read processing portion 402, file characteristic monitoring/migration processing portion 403, file-unit WORM command processing portion 404, and volume-unit WORM command processing portion 405.

The write processing portion 401 receives file write commands, and if the file is a newly created file, writes the file to the AOU-LU 201A. Further, if the file is to be updated, the write processing portion 401 checks the file characteristics of the file, selects the LU having the optimum LU characteristics for the file characteristics, and writes the file to the selected LU (however, if the write target is a WORM file or LU, updating is forbidden). As meta-information, the write processing portion 401 updates the average update interval, an example of which is shown in FIG. 11, and the average increase size, an example of which is shown in FIG. 12, for use by the file characteristic monitoring/migration processing portion 403. The average update interval and the average increase size are each computed for individual files.

The average update interval for file A represents the averaged time intervals between updates of file A, and is information serving as an index of the update frequency. This average update interval can be computed based on the current update date and time, the previous update date and time, and the previous average update interval. Specifically, for example the average update interval over N updates can be computed using the formula average update interval over N updates={difference between the average update interval over (N−1) updates×(N−2)+difference between update date/time of (N−1)nd and Nth updates}/(N−1)

Here, when N=0, the file is being newly stored, and so there is no average update time interval; when N=1, the file is being updated for the first time, and so the average time interval is the difference between the update date/time for the 0th update and the update date/time for this update.

The average increase size of file A is information representing the amount by which, on average, the file size of file A increases. If the average increase size is negative, the file size decreases. The average increase size can be computed based on the file size after the previous update and the previous average increase size. Specifically, for example the average increase size over N updates can be computed using the formula average increase size over N updates={average increase size over (N−1) updates×(N−2)+difference between file size after update for Nth and (N−1)th updates}/(N−1)

Here, when N=0, the file is being newly stored, and so there is no average increase size; when N=1, the file is being updated for the first time, and so the average increase size is the difference between the file size for the 0th update and the file size after this update.

The read processing portion 402 receives file read commands, searches for the file from LUs for different characteristics, acquires block data constituting a retrieved file, assembles the file from the acquired block data, and returns the file to the source of issue of the read command. The read processing portion 402 can use a method similar to that for the average update time to compute the average read time for each file.

The file characteristic monitoring/migration processing portion 403 periodically verifies the file characteristics of each file according to policies defined by the manager, and when necessary migrates a file to an LU having LU characteristics conforming to the file characteristics. A specific example of policies is shown in FIG. 13. These policies 551 are electronic policies held by the file system program 253, and indicate to which LU a file satisfying at least one condition among those for average update interval (average write interval), average read interval, and average increase size should be migrated. According to the policies 551, a file the average increase size of which exceeds XXX megabytes is moved to AOU-LU 201A. Further, a file to which any one of the conditions of an average read interval exceeding YYY minutes, an average update interval exceeding XYZ minutes, and an average increase size exceeding ZZZ megabytes, is moved to the internal LU 201B. Considering the characteristics of AOU-LU 201A, it is thought appropriate that the size XXX megabytes be larger than ZZZ megabytes.

The file-unit WORM command processing portion 404, upon receiving a file WORM command, copies the file to F-WORM-LU 201D, and sets a WORM attribute (for example, meta-information of the file system, indicating whether the file is a WORM file and indicating the stored date and time) for the file.

The volume-unit WORM command processing portion 405, upon conversion to WORM attributes of a large quantity of files with the same date, secures an LU with capacity equal to or exceeding the total file size and copies all the files to the secured LU, rather than converting files to the WORM attribute individually, and performs WORM conversion for the copy destination LU. The volume-unit WORM command processing portion 405 can delete all of the copy source files.

Below, processing performed by the processing portions 401 to 405 is explained in detail.

Figure 14:
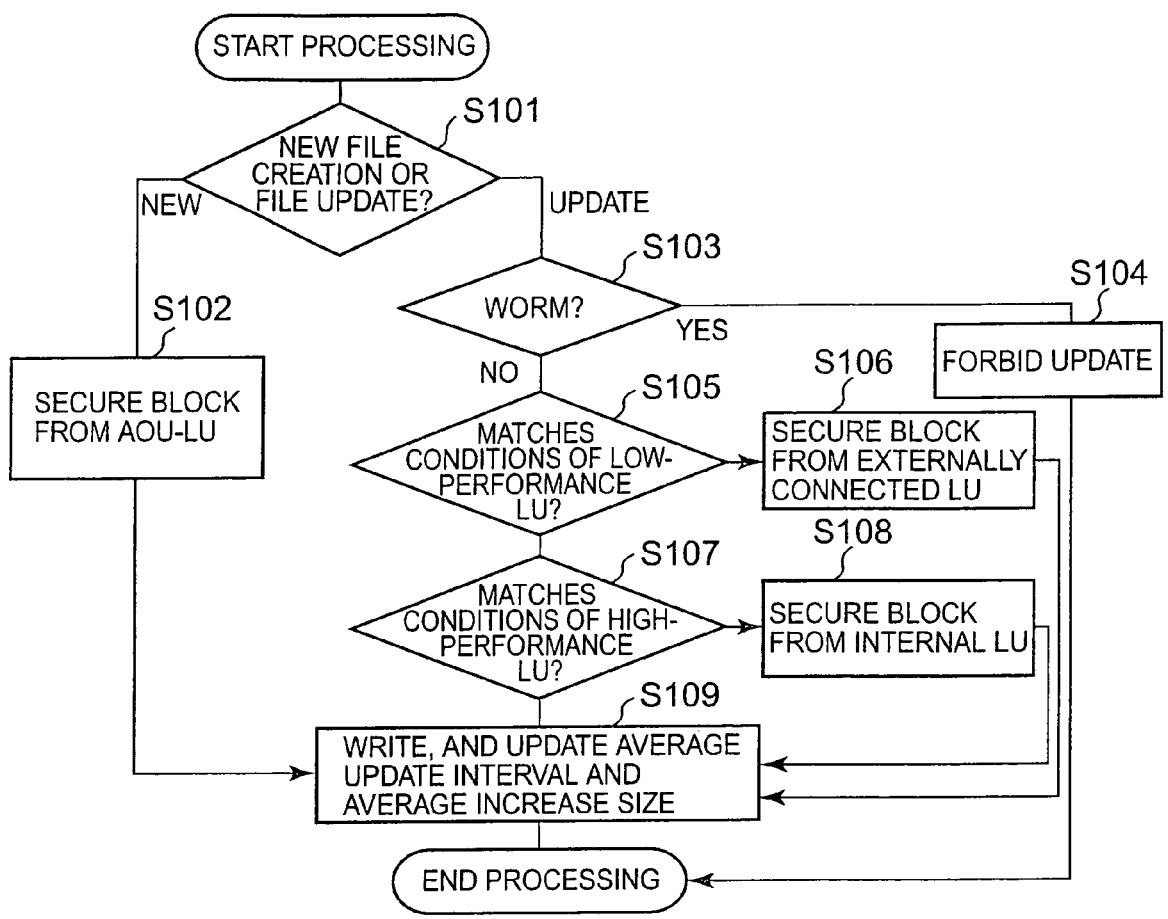
FIG. 14 shows an example of the flow of processing performed by the write processing portion 401.

FIG. 14 shows an example of the flow of processing performed by the write processing portion 401.

The write processing portion 401 receives a file write command, and judges whether the file is a file to be newly created or a file to be updated (S101). This can be performed by for example checking whether a file with the filename of the file is being managed.

If in S101 the write processing portion 401 judges the file to be a new file, a block in which to store the new file is secured in AOU-LU 201A (S102). Here, a block belonging to AOU-LU 201A can be identified from the above-described address map 601 and PV/LU management table 603, so that the new file is not stored spanning a plurality of LUs. The write processing portion 401 writes the new file to the secured block, and updates the above-described average update interval and average increase size (S109).

When in S101 the file is judged to be a file for updating, the write processing portion 401 judges whether the file for updating is a file with the WORM attribute set, and if a file for which the WORM attribute is set, forbids updating of the file to be updated (S104).

If not, the write processing portion 401 judges whether the file for updating matches the conditions of the low-performance LU (S105). Specifically, a judgment is made as to whether the average read interval, average update interval, and average increase size for the file to be updated match the conditions of the externally connected LU, recorded in the policies 551. If there is judged to be a match, the write processing portion 401 secures a block in the externally connected LU 201C (S106), and executes S109. In S109, the file after updating is written to the block secured in the externally connected LU 201C; at this time, the write processing portion 201 may erase the file before updating which exists in another LU separate from the externally connected LU 201C.

If in S105 it is judged that the file for updating does not match the conditions of the low-performance LU, the write processing portion judges whether the file for updating matches the conditions of the high-performance LU (S107). Specifically, a judgment is made as to whether the average read interval, average update interval, and average increase size for the file to be updated match the conditions of the internal LU, recorded in the policies 551. If there is judged to be a match, the write processing portion 401 secures a block in the internal LU 201B, and executes S109. In S109, the file after updating is written to the block secured in the internal LU 201B; at this time, the write processing portion 201 may erase the file before updating which exists in another LU separate from the internal LU 201B.

If in S107 the file for updating is judged not to match the conditions of the high-performance LU, in S109 the write processing portion updates the existing file for updating with the file after updating.

The above is an example of the flow of processing performed by the write processing portion 201. By means of this processing flow, in S109 the average update interval and the average increase size are updated; but there may be cases in which the update itself causes the file after updating to match the conditions of the low-performance LU or of the high-performance LU. In such cases, at the time of the next update (updating in S101), the file is stored in the LU conforming to the matching conditions.

Figure 15:
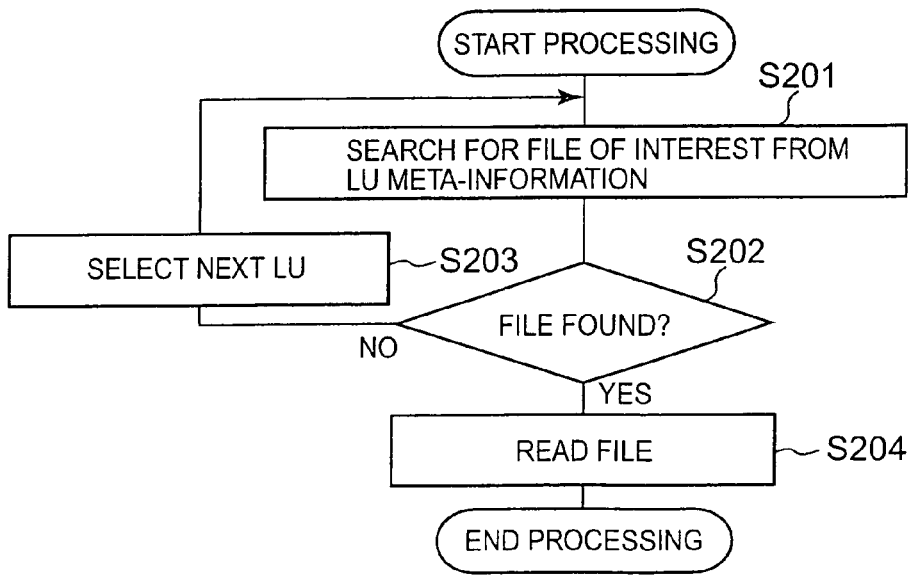
FIG. 15 shows an example of the flow of processing performed by the read processing portion 402.

FIG. 15 shows an example of the flow of processing performed by the read processing portion 402.

The read processing portion 402 receives file read commands for the file system 254. The read processing portion 402 selects an LU from among all LUs belonging to the file system 254, and searches for the file specified by the read command from the meta-information for the selected LU (S201). If the file cannot be found (N in S202), the read processing portion 402 selects the next LU from all the LUs (S203), and searches for the file from the meta-information for the LU. If the file is found (Y in S202), the read processing portion 402 reads the discovered file (that is, the file specified by the read command) (S204), and transmits the file to the source of issue of the read command. In S204, updating of the average read interval may be performed as well.

Figure 16:
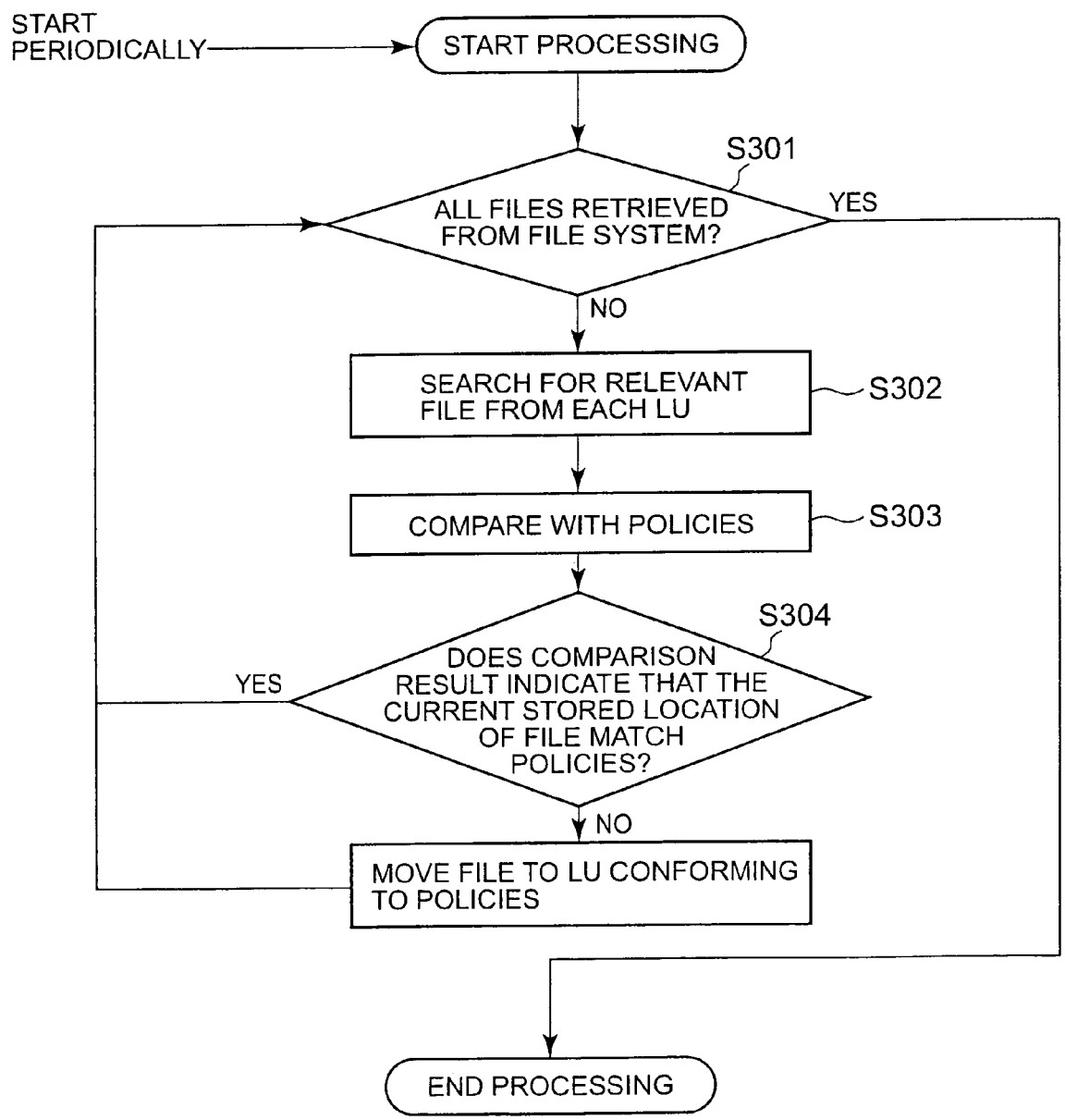
FIG. 16 shows an example of the flow of processing performed by the file characteristic monitoring/migration processing portion 403.

FIG. 16 shows an example of the flow of processing performed by the file characteristic monitoring/migration processing portion 403.

The file characteristic monitoring/migration processing portion 403 is started periodically.

The file characteristic monitoring/migration processing portion 403 searches for a file of interest from each of the LUs belonging to the file system 254 (N in S301, S302). Here, a file of interest is a file which has not been retrieved since the program was started, and is selected arbitrarily.

The file characteristic monitoring/migration processing portion 403 compares the file characteristics of the file of interest with the policies 551 (S303).

If as a result the current storage location of the file conforms to the conditions expressed by the policies 551, that is, if the file of interest is in an LU having LU characteristics which conform to the file characteristics (Y in S304), then there is no need for migration, and the file characteristic monitoring/migration processing portion 403 returns to S301.

If on the other hand, as the result of S303, the current storage location of the file does not conform to the conditions expressed by the policies 551, that is, if the file of interest is not in an LU having LU characteristics which conform to the file characteristics (hereafter, a "conforming LU") (N in S304), then the file characteristic monitoring/migration processing portion 403 moves the file to a conforming LU (S305).

The file characteristic monitoring/migration processing portion 403 performs S302 and subsequent steps for the files in all LUs belonging to the file system 254, and when this is completed (Y in S301), processing ends.

Figure 17:
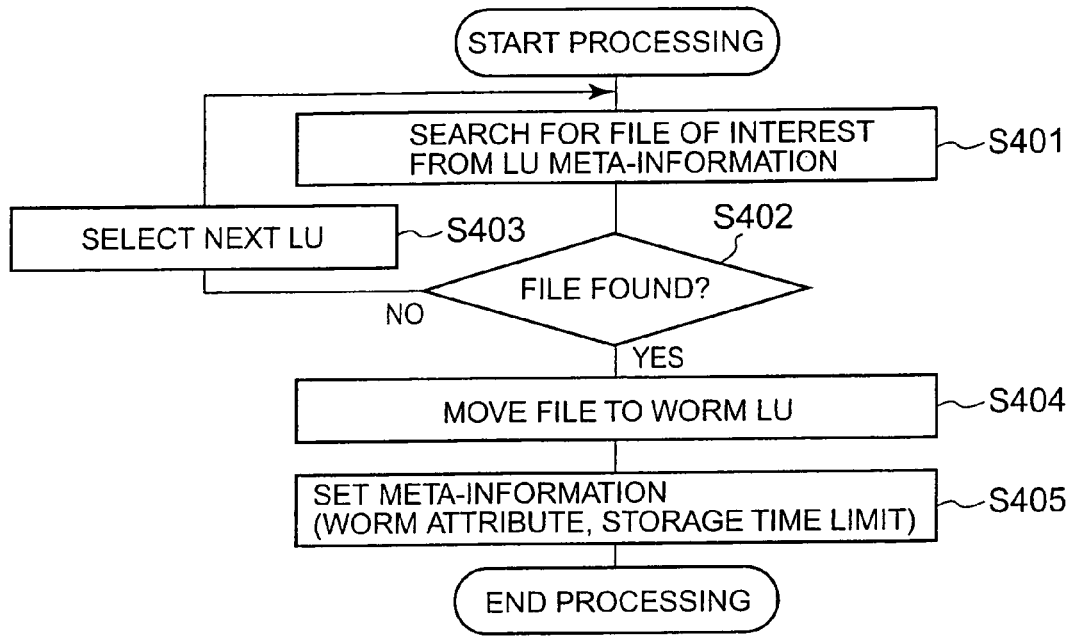
FIG. 17 shows an example of the flow of processing performed by the file-unit WORM command processing portion 404.

FIG. 17 shows an example of the flow of processing performed by the file-unit WORM command processing portion 404.

The file-unit WORM command processing portion 404 receives commands specifying files for WORM conversion (file-unit WORM conversion commands) in the file system 254. In this case, the file-unit WORM command processing portion 404 selects an LU from all the LUs belonging to the file system 254, and searches for the specified file from the meta-information of the selected LU (S401). If the file cannot be found (N in S402), the file-unit WORM command processing portion 404 selects the next LU from all the LUs (S403), and performs a file search from the LU meta-information. When the file is found (Y in S402), the file-unit WORM command processing portion 404 moves the file which has been found (that is, the file specified by the file-unit WORM command) to the F-WORM-LU 201D (S404), and sets meta-information (for example, the WORM attribute, and the storage time limit) for the file after movement (S405).

If the file-unit WORM command is equivalent to writing of a new file, for example, then the file specified by the command may be stored in the F-WORM-LU 201D rather than in the AOU-LU 201A.

Figure 18:
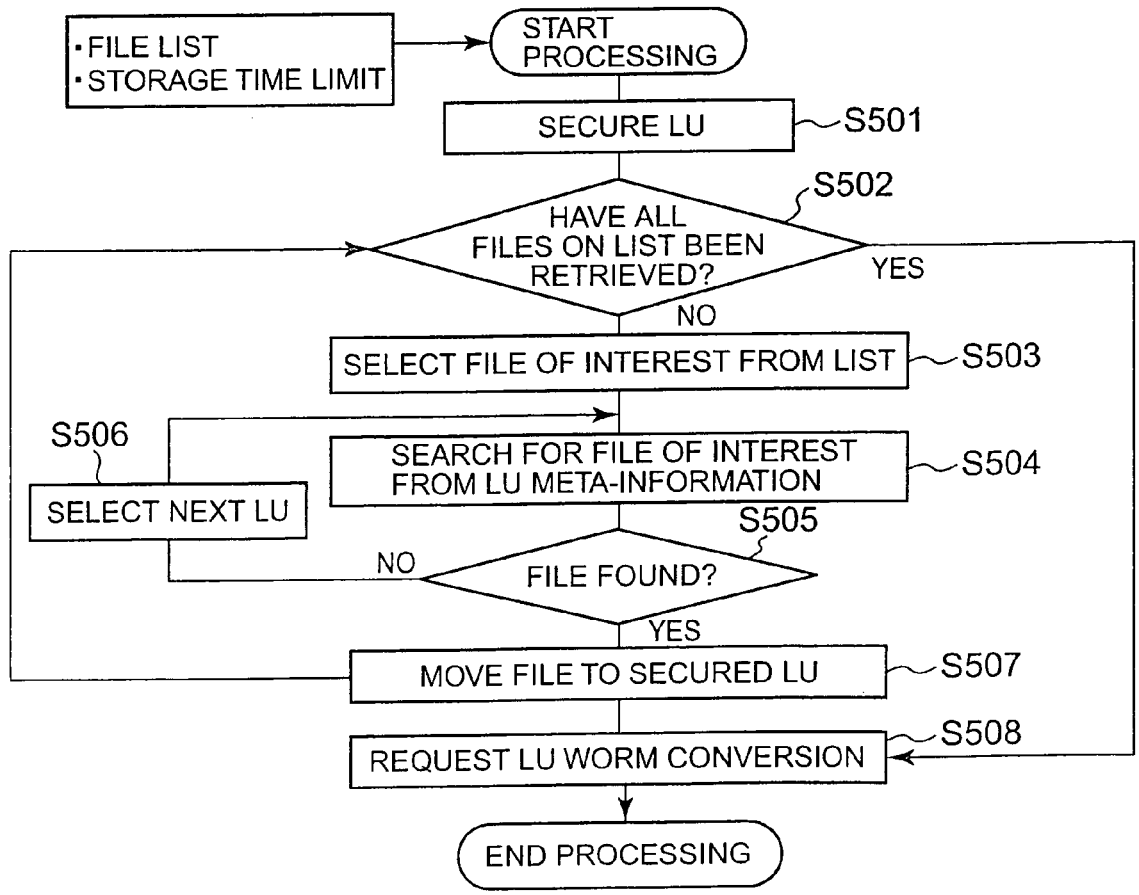
FIG. 18 shows an example of the flow of processing performed by the volume-unit WORM command processing portion 405.

FIG. 18 shows an example of the flow of processing performed by the volume-unit WORM command processing portion 405.

The volume-unit WORM command processing portion 405 receives a file list, storage time limit, and a volume-unit WORM command for the file system 254. In the file list are recorded the identifiers (for example, filenames) and sizes of all files for WORM conversion. The storage time limit is a time limit common to all files.

The volume-unit WORM command processing portion 405 secures an LU from the storage system 9A (S501). The size of the secured LU is equal to or greater than the total file size of all the files.

Next, the volume-unit WORM command processing portion 405 selects a file of interest from the file list (N in S502, S503). Here the file of interest is a file not yet selected from the file list, and is an arbitrary file.

The volume-unit WORM command processing portion 405 selects an LU from all the LUs belonging to the file system 254, and searches for the file of interest from the meta-information for the selected LU (S504). If the file cannot be found (N in S505), the volume-unit WORM command processing portion 405 selects the next LU from all the LUs (S506), and searches for the file of interest from the meta-information for the LU. If the file is found (Y in S505), the volume-unit WORM command processing portion 405 moves the file of interest which has been found to the LU secured in S501 (S507).

The volume-unit WORM command processing portion 405 repeats the processing of S503 through S507 for all of the files recorded in the file list, and when this is completed (Y in S502), requests WORM conversion of the LU secured in S501 by the storage system 9A (S508). At this time, the storage system 9A is notified of the storage time limit. By this means, the LU becomes a V-WORM-LU 201E with the storage time limit set.

When the volume-unit WORM command is equivalent to writing of a new file, for example, then the file specified by the command may be stored in the V-WORM-LU 201E rather than in the AOU-LU 201A.

In the above, an aspect has been explained.

By means of the above-described aspect, even when a plurality of LUs are combined in a single file system 254, I/O processing on a lower-level layer is performed based on an address map 601 and PV/LU management table 603, so that one file is never stored spanning a plurality of LUs.

By means of the above-described aspect, electronic policies 551 are set to determine which files with which characteristics are to be stored in which LUs with which characteristics, and file rearrangement is performed as necessary according to the policies 551. That is, files are classified according to the characteristics of each file, and files are migrated as appropriate to LUs conforming to the respective file characteristics. Hence efficient operation management is possible during backups, migration and similar, according to file characteristics.

Further, by means of the above-described aspect, even when such file classification is performed, no change occurs in the logical view (for example, a view of the contents of directories) presented to a user using the file system 254. Hence there is no detraction from usability, and adverse effects on user-side tasks can be prevented.

By means of the above-described aspect, newly created files, and files with large average increase sizes, are stored in an AOU-LU. It is thought that in many cases, sizes estimated upon system creation are not optimum sizes when operation is continued. For example, although an LU with large storage capacity has been secured, when there is a large unused storage capacity, the unused storage capacity cannot be employed for other uses, and so considerable waste occurs. An AOU (automatic capacity expansion function) is a function the aim of which is to efficiently use storage capacity; even when a large estimated size (for example, one terabyte) is specified, depending on conditions of use, in actuality the storage capacity is increased and decreased in small amounts (for example, in 100 megabyte units). At the time a file is created, the future size of the file cannot be predicted, and so selection of the AOU-LU as the initial location for storage of newly created files is thought to be optimal.

Further, by means of the above-described aspect, WORM-converted files are stored in the WORM LUs 201D or 201E. If files with the WORM attribute set are scattered throughout a file system comprising a plurality of LUs (specifically, if files set to WORM and files not so set are intermixed in a single LU), and a case occurs in which a file set to WORM is to be migrated, because migration is performed in file units, file searching becomes necessary. In such a case, it is expected that the overhead due to file searching may impose a burden on processing. However, in the above-described aspect, there is an LU in which only WORM-converted files are stored, and a WORM-converted file is stored in this LU; hence in cases in which a file with the WORM setting is to be migrated, migration in LU units becomes possible. Consequently the overhead due to file searching can be eliminated.

Further, in the above-described aspect the WORM attribute can be set not only in file units, but in volume units; as technology to accomplish this, for example, the technology disclosed in Japanese Patent Laid-open No. 2000-112822, or in U.S. patent application Ser. No. 10/769887, can be employed. In this technology, a method is used in which, when setting an LU to the WORM attribute, LDEVs (logical storage devices) constituting the LU are set to the "Read Only" attribute. Here, an LU comprises one or more LDEVs.

The mechanism of the above-described aspect can be applied to storage systems used in a jukebox-like mode. That is, in general storage systems there are limits to the LUs (or storage devices) which can be constantly connected, due to constraints on control portions and for other reasons, and so constraints on the storage capacity at any given time occur. However, by connecting and disconnecting LUs (or storage devices) as necessary (that is, through use in a jukebox-type mode), it is possible for a larger number of LUs (or storage devices) to exist without problem. By means of this aspect, files are stored in LUs according to file characteristics, and so a storage system used in such a jukebox-type mode can easily be accommodated.

In the above, preferred aspects of the invention have been explained; but these are merely examples used to explain the invention, and the scope of the invention is not limited to these aspects. This invention can be implemented in various modes.

For example, at the time of storage of a new file, control can be executed such that the file system program 253 checks the file paths in a plurality of LUs belonging to the file system 254, and if a file exists with file path matching that of the new file, the new file is not stored (in this case, the user can be prompted to assign a different filename).

Further, when for example an LU belonging to a different file system is imported (incorporated) into the file system 254, the file system program 253 can check for redundancy between the file paths of files in the LU and the file paths of all files in all LUs already imported into the file system 254. If there exist matching file paths, the file system program 253 can either prompt the user to change one of the file paths, or can change a file path automatically.

What is claimed is:

1. A file storage control device, connected to a higher-level device and a lower-level storage system, which receives file write requests and file read requests from said higher-level device, comprising:

a storage space provision portion, which provides, as a file, to the higher-level device, a single storage space associated with a plurality of logical storage units (LUs) provided by said storage system;

a reception portion, which receives from said higher-level device the file write requests to said provided storage space; and a storage control portion, which selects an LU from among said plurality of LUs associated with the storage space specified by one of said file write requests, and stores in the selected LU all the data constituting said file according to said one of said file write requests, wherein said storage control portion checks the file characteristics of each file stored in said plurality of LUs, identifies first LU characteristics matching the file characteristics of a checked file, and if the checked file exists in a second LU with second LU characteristics different from a first LU with said identified first LU characteristics, causes the checked file to be migrated from said second LU to said first LU, wherein said storage system provides an automatic capacity-expansion LU to said file storage control device, and allocates unallocated storage areas among a plurality of storage areas to the automatic capacity-expansion LU, according to writing to the automatic capacity expansion LU, wherein said automatic capacity-expansion LU is included in said plurality of LUs, wherein said file storage control device further comprises a file size management portion which manages, for each file, an average increase size, which is a file size increase per unit time due to updating, and wherein said storage control portion causes files with an average increase size equal to or greater than a prescribed value to be migrated to said automatic capacity-expansion LU.

2. A file storage control method, comprising the steps of:

providing, as a file, to a higher-level device used by a user, a single storage space associated with a plurality of logical storage units (LUs) provided by a storage system;

receiving file write requests to said provided storage space from said higher-level device;

selecting a LU from among said plurality of LUs associated with the storage space specified by one of said file write requests; and storing all the data constituting said file according to said one of said file write requests in the selected LU, wherein a storage control portion checks the file characteristics of each file stored in said plurality of LUs, identifies first LU characteristics matching the file characteristics of a checked file, and if the checked file exists in a second LU with second LU characteristics different from a first LU with said identified first LU characteristics, causes the checked file to be migrated from said second LU to said first LU, wherein said storage system provides an automatic capacity-expansion LU to a file storage control device, and allocates unallocated storage areas among a plurality of storage areas to the automatic capacity-expansion LU according to writing to the automatic capacity-expansion LU, wherein said automatic capacity-expansion LU is included in said plurality of LUs, wherein said file storage control device further comprises a file size management portion which manages, for each file, an average increase size, which is a file size increase per unit time due to updating, and wherein said storage control portion causes files with an average increase size equal to or greater than a prescribed value to be migrated to said automatic capacity-expansion LU.

3. A file storage control device, connected to a higher-level device and a lower-level storage system, which receives file write requests and file read requests from said higher-level device, comprising:

a storage space provision portion, which provides as a file, the higher-level device, a single storage space associated with a plurality of logical storage units (LUs) provided by said storage system;

a reception portion, which receives from said higher-level device the file write requests to said provided storage space; and a storage control portion, which selects an LU from among said plurality of LUs associated with the storage space specified by one of said file write requests, and stores in the selected LU all the data constituting said file according to said one of said file write requests, wherein said storage control portion checks the file characteristics of each file stored in said plurality of LUs, identifies first LU characteristics matching the file characteristics of a checked file, and if the check file exists in a second LU with second LU characteristics different from a first LU with said identified first LU characteristics, causes the checked file to be migrated from said second LU to said first LU, wherein said storage control portion identifies a WORM (Write Once Read Many) file among the plurality of files stored in said plurality of LUs, and causes said identified WORM file to be migrated to a WORM LU among said plurality of LUs, wherein, when storage time limits are set in file units, said storage control portion causes files having the storage time limits to be migrated to said WORM LU, and sets a WORM attribute and the storage time limits for the migrated files, and, when a same storage time limit is set for two or more files, said storage control portion secures an LU having storage capacity equal to or greater than the total file size of the two or more files from among said plurality of LUs, causes the two or more files to be migrated to the secured LU, and causes a WORM attribute and a storage time limit to be set for the secured LU.

4. A file storage control method, comprising the steps of:

providing as a file, to a higher-level device used by a user, a single storage space associated with a plurality of logical storage units (LUs) provided by a storage system;

receiving file write requests to said provided storage space from said higher-level device;

selecting a LU from among said plurality of LUs associated with the storage space specified by one of said file write requests; and storing all the data constituting said file according to said one of said file write requests in the selected LU, wherein a storage control portion checks the file characteristics of each file stored in said plurality of LUs, identifies first LU characteristics matching the file characteristics of a checked file, and if the checked file exists in a second LU with second LU characteristics different from a first LU with said identified first LU characteristics, causes the checked file to be migrated from said second LU to said first LU, wherein said storage control portion identifies a WORM (Write Once Read Many) file among the plurality of files stored in said plurality of LUs, and causes said identified WORM file to be migrated to a WORM LU among said plurality of LUs, wherein, when storage time limits are set in file units, said storage control portion causes files having the storage time limits to be migrated to said WORM LU, and sets a WORM attribute and the storage time limits for the migrated files, and, when a same storage time limit is set for two or more files, said storage control portion secures an LU having storage capacity equal to or greater than the total file size of the two or more files from among said plurality of LUs, causes the two or more files to be migrated to the secured LU, and causes a WORM attribute and a storage time limit to be set for the secured LU.

* * * * *